United States Patent
Chen

[19]

[11] Patent Number: 5,963,438
[45] Date of Patent: Oct. 5, 1999

[54] BI-DIRECTIONAL MAGNETIC ISOLATOR

[75] Inventor: Mingliang Chen, Blacksburg, Va.

[73] Assignee: Virginia Power Technologies, Inc., Blacksburg, Va.

[21] Appl. No.: 09/058,995

[22] Filed: Apr. 13, 1998

[51] Int. Cl.[6] .................................................. H02M 3/335
[52] U.S. Cl. .............................................. 363/21; 363/20
[58] Field of Search .................................. 363/15, 16, 20, 363/21, 95, 97, 131

[56] References Cited

U.S. PATENT DOCUMENTS

| | | | |
|---|---|---|---|
| 4,323,961 | 4/1982 | Josephson . | |
| 4,495,554 | 1/1985 | Simi et al. ................................. | 363/21 |
| 4,618,919 | 10/1986 | Martin, Jr. ................................. | 363/21 |
| 4,763,237 | 8/1988 | Wieczorek ................................. | 363/20 |
| 5,448,465 | 9/1995 | Yoshida et al. ............................ | 363/15 |

*Primary Examiner*—Matthew Nguyen
*Attorney, Agent, or Firm*—James H. Beusse; Holland & Knight LLP

[57] ABSTRACT

A bi-directional, magnetic isolator which can pass an isolated housekeeping supply voltage from an input side to an output side and can also transfer an isolated error signal from the output side to the input side of the isolator. The dual functions of the magnetic isolator allow a power supply to operate properly during either a no-load or output short circuit condition. The magnetic isolator comprises a pair of pulse transformers each having a primary and a secondary winding. The housekeeping supply voltage is transferred through one of the pulse transformers by pulsing the supply voltage from the primary winding to a secondary winding, rectifying the pulsating voltage and storing the rectified voltage on an output capacitor. The error signal is transferred in an opposite direction through the second pulse transformer using the same technique, i.e., the error signal is chopped to create a pulsating signal that can be transferred from a primary winding to a secondary winding of the second pulse transformer where it is rectified and stored on an output capacitor as a voltage representative of the error signal. A fixed on-time clock is used to pulse both the supply voltage and the error signal.

15 Claims, 3 Drawing Sheets

BI-DIRECTIONAL MAGNETIC ISOLATOR

BACKGROUND OF THE INVENTION

This invention applies to isolated switching-mode power supplies and, more particularly, to a method and apparatus for transferring a feedback signal across an input/output isolation barrier in such a power supply.

Switching-mode power supplies are used to convert a varying input voltage into a constant voltage or current. Both the input and output can be alternative current (AC) or direct current (DC). Most of these power supplies require some form of electrical isolation between their input and output either due to a safety regulation or a system requirement. FIG. 1 shows an exemplary isolated switching-mode DC/DC power supply 10 comprising an isolated power stage 12, pulse width modulation (PWM) controller 14, isolated feedback circuit 16 and error amplifier 18.

Different power conversion topologies such as forward, flyback, bridge, etc. can be used in the isolated power stage 12 to adjust its output voltage by controlling the duty cycle of switching. The error amplifier 18 compares the value of the $+V_o$ output voltage to a reference voltage $V_{ref}$ (represented by a zener diode) using a conventional differential amplifier 18a so as to detect the difference between the output voltage and the pre-set or reference value, and generate an error signal. This error signal is then transferred to the PWM controller 14 through the isolated feedback circuit 16. The PWM controller 14 produces a switching signal with a proper duty cycle based on the received error signal. The switching signal is used in the isolated power stage 12 to control power conversion and to regulate the output voltage $V_o$.

Optocouplers have been widely used in the isolated feedback circuit 16. They are simple to use and very low cost. However, they have the disadvantages that the current transfer ratio (CTR) of optocouplers has a large tolerance value from part to part, the CTR also changes significantly with temperature and time, and the frequency response of optocouplers is very poor. These shortcomings prevent optocouplers from being used in high performance and high reliability power supplies.

To overcome the shortcomings of optocouplers, different kinds of magnetic feedback schemes have been developed. In U.S. Pat. No. 4,323,961, there is disclosed a magnetic feedback circuit that transfers a digital signal from an output side to an input side of a power supply. In this patent, a PWM controller located in the output side of the power supply generates a digital signal with a proper duty cycle depending on the load demand or the input voltage. The duty cycle of this digital signal is then used to turn on and off a main switch. To be able to operate properly, the circuit requires a steady switching waveform appearing at the output side of the power supply. Any interruption of the switching waveform during no load condition or output short circuit will degrade the performance of this circuit.

Another form of isolated feedback is commercially available from Unitrode Corporation as an isolated feedback generator integrated circuit (UC3901). This device applies an amplitude modulation to an analog error signal generated by an error amplifier in the output side of the power supply. This modulated signal is transferred to the input side through a magnetic isolator. The feedback signal is then de-modulated and fed to a PWM controller. This scheme is very complicated and the frequency response is poor due to the delay time in the de-modulation process.

SUMMARY OF THE INVENTION

The present invention discloses a simple and effective bi-directional magnetic isolator which can pass an isolated housekeeping supply voltage from input side to output side and can also transfer an isolated error signal from the output side to the input side. The dual functions of this magnetic isolator allow a power supply to operate properly during either no load or output short circuit condition. In an illustrative form, the invention comprises a wide bandwidth and high reliability bi-directional magnetic isolator including a pair of pulse transformers each having a primary and a secondary winding. The bi-directional magnetic isolator performs the two functions of transmitting an error signal from the output side to the input side via a first pulse transformer $T_2$ and generating an output side housekeeping voltage supply via another pulse transformer $T_1$. This bi-directional magnetic isolator uses an external fixed on-time clock input of the type normally available in a typical PWM controller.

The output side housekeeping voltage supply generated by the bi-directional magnetic isolator enables the power supply to be able to operate properly during a no load condition or an output short circuit. This output side housekeeping voltage supply allows the power supply to regulate the short circuit current precisely and to provide fault indication at the output side.

The gain of the bi-directional magnetic isolator is very accurate and highly reliable because it is solely determined by the primary/secondary turn ratio of transformer $T_2$. The bandwidth of this bi-directional magnetic isolator is also very wide. The limiting factor is a small RC time delay. Both transformers $T_1$ and $T_2$ operate in a forward peak-charging mode and dissipate very little power. A very small size magnetic core is adequate to implement these two pulse transformers.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
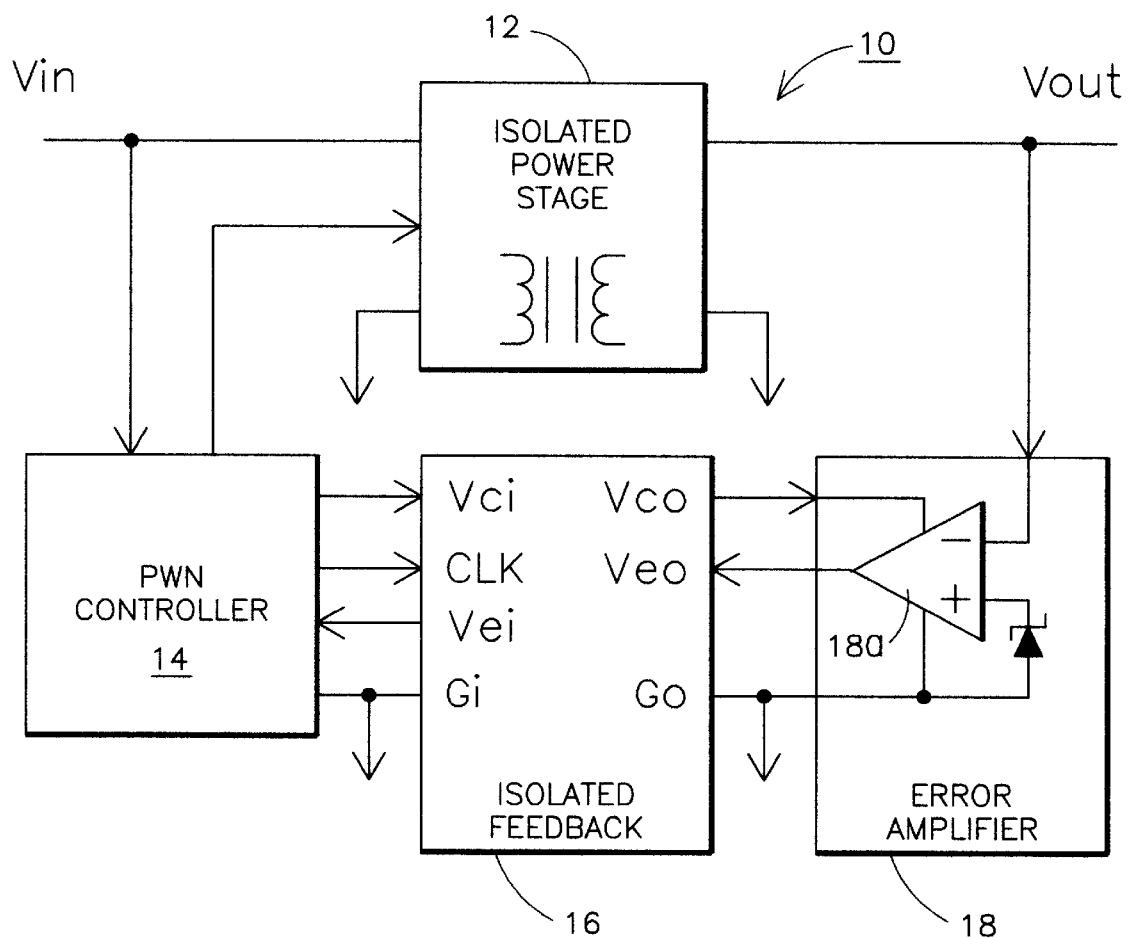
FIG. 1 is a typical isolated DC/DC power supply.
Figure 2:
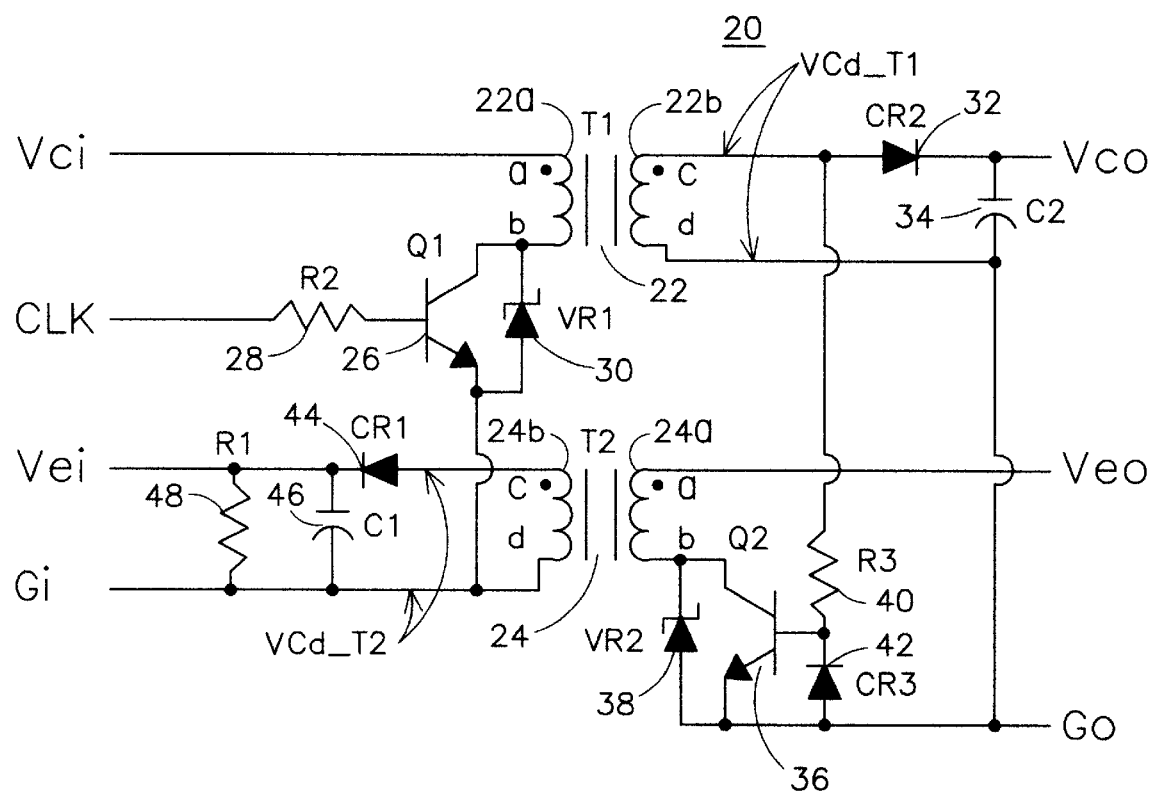
FIGS. 2 and 2a show the circuit and key waveforms, respectively, of a bi-directional magnetic isolator with a positive gain.

The bi-directional magnetic isolator of the present invention is disclosed in two basic configurations—one with a positive gain and the other with a negative gain. The positive-gain bi-directional magnetic isolator is shown in FIG. 2. The magnitude of the error signal, $V_{ei}$, transferred to the power supply input side through the magnetic isolator linearly increases with the increase of the error signal, $V_{eo}$, at the power supply output side. This type of isolator is to be used in a PWM controller with positive feedback input. In the negative-gain bi-directional magnetic isolator shown in FIG. 3, the magnitude of the input side error signal, $V_{ei}$, linearly decreases with the increase of the output side error signal, $V_{eo}$. This type of isolator is to be used in a PWM controller with negative feedback input. For this description, input side and output side refer respectively to the input side and output side of the isolated power stage.

Figure 2A:
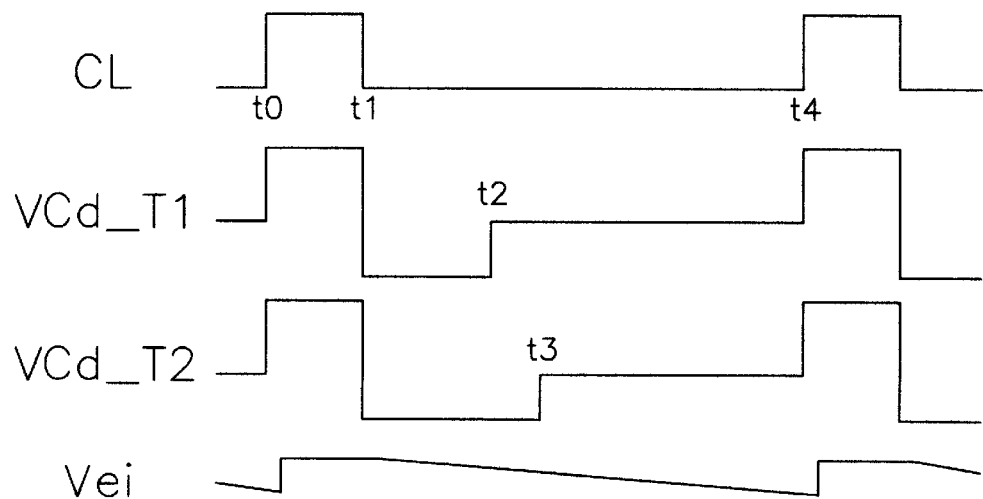

FIG. 2 is a schematic and FIG. 2a illustrates key corresponding waveforms of a positive-gain bi-directional magnetic isolator 20. The magnetic isolator 20 requires an input side housekeeping voltage supply, $V_{ci}$, and a constant on-time clock (CLK) input. The input side error signal, $V_{ei}$, is generated linearly proportional to the output side error signal, $V_{eo}$. The magnetic isolator also produces an output side housekeeping voltage supply, $V_{co}$, that can be used to power all the output side control circuits.

As shown in FIG. 2, the magnetic isolator comprises a pair of pulse transformers 22 and 24. The transformer 22 is used to provide an isolated DC voltage $V_{co}$ from input voltage $V_{ci}$. The transformer 24 is used to transfer the error signal $V_{eo}$ toprovide the control error signal $V_{ei}$. Transformer 22, also indicated as $T_1$, has a primary winding 22a with one terminal 'a' connected to a source of voltage $V_{ci}$. A second terminal 'b' of transformer 22 is connected through a controllable electronic switching device 26 to a ground reference indicated at Gi. In the illustrated form, the switch 26 is illustrated as a transistor. The switch 26 is controlled by a clock signal CLK which is supplied to a gate terminal of switch 26 through a resistor 28. A reverse parallel connected zener diode 30 coupled between the collector and emitter of the transistor 26 provides a current path for resetting the magnetic flux in the transformer 22 when the switch 26 is gated out of conduction. Transformer 22 also includes a secondary winding 22b which is connected via a rectifier 32 to a capacitor 34. The rectifier 32, illustrated as a diode, provides the uni-diectional current to allow charging of the capacitor 34 to a positive output voltage $V_{co}$. The capacitor voltage $V_{co}$ is referenced to an output ground indicated at Go.

The second transformer 24, also indicated as $T_2$, includes a primary winding 24a connected for receiving the voltage output error signal $V_{eo}$ from the output of the error amplifier 18. As is illustrated, one terminal 'a' of transformer primary winding 24a is connected to receive the $V_{eo}$ signal and another terminal 'b' of winding 24a is connected through a controllable electronic switch 36 to ground reference Go. The switch 36 may be identical to the switch 26 and is also coupled in circuit with a reverse parallel zener diode 38 which allows the magnetic flux in the transformer 24 to be reset during the off time of the switch 36. A gate terminal of the transistor switch 36 is connected to receive a voltage output from the terminal 'c' of transformer secondary winding 22b through a resistor 40. A diode 42 connected between the gate terminal of transistor 36 and the ground reference Go provides a shunt path for negative voltage appearing on the terminal 'c' of transformer secondary winding 22b. The secondary winding 24b of transformer 24 is coupled through a rectifier circuit comprising a diode 44 to a capacitor 46 which stores a value of voltage $V_{ei}$ representative of the magnitude of the error voltage $V_{eo}$ impressed on the primary winding 24a. A resistor 48 is connected in parallel with capacitor 46 and provides a controlled discharge rate for charge stored on capacitor 46.

To understand the operation of the circuit of FIG. 2, reference is made to the signal diagrams of FIG. 2a in conjunction with the following description. At time $t_0$, the CLK input signal changes from zero volts to $+V_H$ where $V_H$ is high enough to turn switch 26 on completely. The CLK input remains at $+V_H$ between $t_0$ and time $t_1$. At $t_1$, the CLK input changes its state from $+V_H$ back to zero volts and remains at that state till time $t_4$ or the next clock cycle. When the CLK input is at zero volts, transistor switch 26 will be gated off. At $t_4$, a new repetitive cycle begins.

Between times $t_0$ and $t_1$ switch 26 is gated on and the input housekeeping voltage supply, $V_{ci}$ is applied directly across the primary winding 22a (between terminals a and b) of transformer 22. The voltage across the secondary winding 22b (between terminals c and d) of transformer 22, $V_{cd\_t1}$, is then equal to $(N_{cd1}/N_{ab1})*V_{ci}$ (if the voltage drop of switch 26 is neglected), where $N_{ab1}$ and $N_{cd1}$ are the number of turns of the primary winding and secondary winding of transformer 22 respectively. During this time period, capacitor 34 will be charged to the voltage $(N_{cd1}/N_{ab1})*V_{ci}$ through diode 32 if the voltage drop of diode 32 is neglected. The voltage across capacitor 34 is the output side housekeeping voltage supply, $V_{co}$. Therefore, $V_{co}$ is approximately equal to $(N_{cd1}/N_{ab1})*V_{ci}$. During this time period, the positive voltage $V_{cd\_T1}$ appearing at winding 22b also turns transistor switch 36 on. The output side error signal, $V_{eo}$, is then applied directly to the primary winding 24a (between a and b) of transformer 24. The voltage across the secondary winding 24b (between c and d) of transformer 24, $V_{cd\_T2}$, is then equal to $(N_{cd2}/N_{ab2})*V_{eo}$ if the voltage drop of transistor 36 is neglected, where $N_{ab2}$ and $N_{cd2}$ are the number of turns of the primary winding and secondary winding of transformer 24, respectively. Capacitor 46 is then charged to the voltage $(N_{cd2}/N_{ab2})*V_{eo}$ through diode 44 if the voltage drop of diode 44 is neglected. The voltage across capacitor 46 is used as the input side error signal, $V_{ei}$. Therefore, $V_{ei}$ is approximately equal to $(N_{cd2}/N_{ab2})*V_{eo}$.

Between times $t_1$ and $t_2$, transistor 26 is turned off and transformer 22 is reset through zener diode 30 where the magnetizing energy of transformer 22 is dissipated. The time required for transformer reset, i.e., the time between $t_1$ and $t_2$ can be calculated and is equal to $(t_1-t_0)*(V_{ci}/(V_{VR1}-V_{ci}))$, where $V_{VR1}$ is the zener voltage of diode 30 and needs to be much higher than $V_{ci}$ so that transformer 22 can be completely reset before a new clock cycle begins at time $t_4$. This implies that time $t_1$ to $t_2$ must be less than time $t_1$ to $t_4$. During time period between $t_1$ and $t_2$, the voltage across the primary winding 22a become negative and is equal to $-(V_{VR1}-V_{ci})$. The voltage across the secondary winding of 22b, $V_{cd\_T1}$ is then equal to $-(N_{cd1}/N_{ab1})*(V_{VR1}-V_{ci})$ which reverse biases diode 32 and turns it off. The voltage across capacitor 34 remains at $(N_{cd1}/N_{ab1})*V_{ci}$. At time $t_1$, the negative voltage $V_{Vcd\_T1}$ also gates transistor 36 out of conduction allowing transformer 24 to be reset through diode 38 between times $t_1$ and $t_3$. The time $t_3$ can be calculated and is equal to $(t_1-t_0)*(V_{eo}/(V_{VR2}-V_{eo}))+t_1$, where $V_{VR2}$ is the zener voltage of diode 38 and needs to be much higher than $V_{eo}$ so that transformer 24 can be completely reset before a new clock cycle begins at time $t_4$. This implies that time $t_1$ to $t_3$ must be less than time $t_1$ to $t_4$. Between times $t_1$ and $t_3$, the voltage across the primary winding of 24a of transformer 24 become negative and is equal to $-(V_{VR2}-V_{eo})$. The voltage across the secondary winding of 24b, $V_{cd\_T2,}$ is then equal to $-(N_{cd2}/N_{ab2})*(V_{VR2}-V_{eo})$ which reverse biases diode 44 turned it off during this time period. The voltage across capacitor 46, $V_{ei,}$ begins to discharge slowly through resistor 48 at time $t_1$ and continues till time $t_4$.

The bandwidth, $f_b$, of this magnetic isolator is determined by $R_d$, the dynamic resistance of diode 44, resistor 48 and capacitor 46. The bandwidth $f_b$ can be approximately expressed as $1/(2*\pi*R_d*C_1)$, where $C_1$ is the capacitance of capacitor 46, and assuming that the value of resistor 48 is much larger than $R_d$. For example, in the case that $R_d=300\Omega$, resistor 48=51 k$\Omega$ and $C_1=3000$ pF, $f_b$ is approximately equal to 177 kHz.

The zener diodes 30 and 38 can also be eliminated if the parasitic capacitance in the circuit is large enough to reset both transformers 22 and 24 in a resonant fashion while not creating too much voltage stress to either switch 26 or switch 36. This condition is quite possible when the frequency of the clock signal CLK is very high and the pulse width (time $t_0-t_1$) is very narrow. A resistor-capacitor-diode reset or an additional reset winding can also replace the zener diode reset for both transformers.

Figure 3:
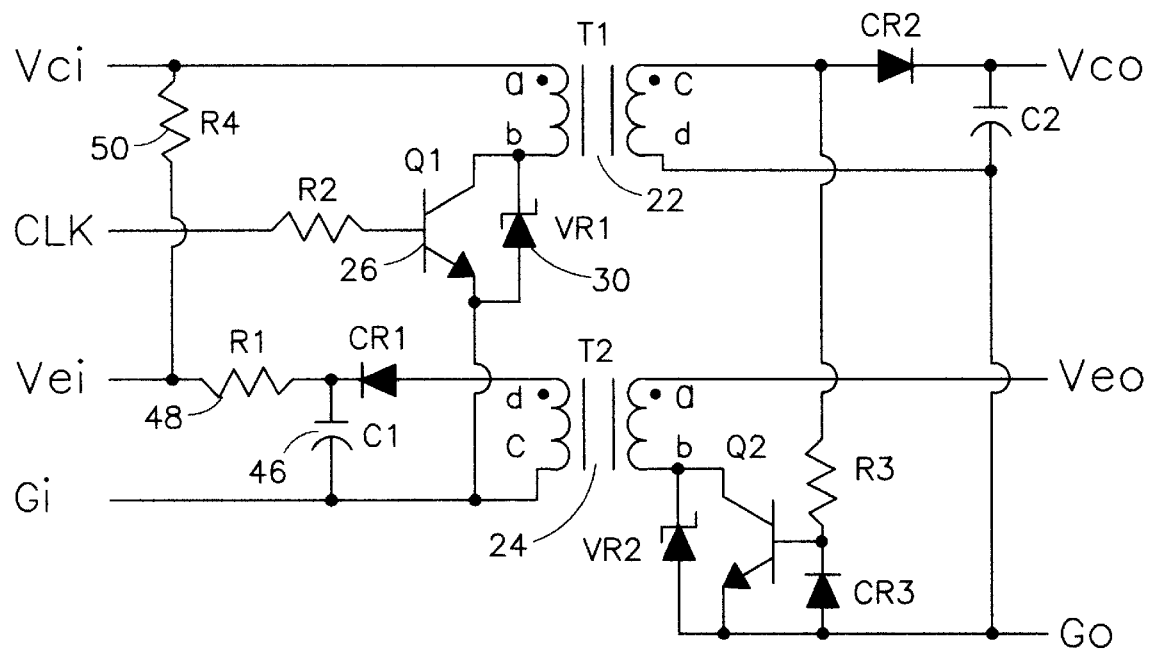
FIGS. 3 and 3a show the circuit and key waveforms, respectively, of a bi-directional magnetic isolator with a negative gain.
Figure 3A:
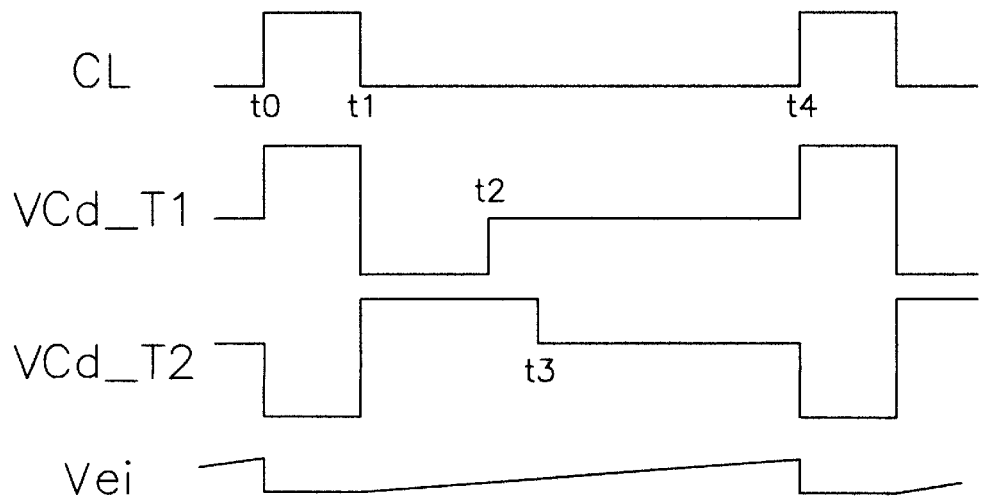

FIG. 3 shows the detailed circuit and key corresponding waveforms of the negative-gain bi-directional magnetic isolator. The basic operation and construction of this circuit is very similar to that of the positive-gain bi-directional magnetic isolator of FIG. 2. The only difference is in the use of a pull-up resistor 50 for the input side error signal, $V_{ei}$, and the polarity reversal of capacitor 46 and the secondary winding 24b of transformer 24. Resistor 50 is incorporated to produce a $V_{ei}$ signal based on $V_{ci}$ and $V_{eo}$. Between $t_0$ and $t_1$, $V_{ei}$ is charged to $V_{ci}*R_1/(R_1+R_4)-V_{eo}*(N_{cd2}/N_{ab2})*R_4/(R_1+R_4)$ when the CLK input signal is at $+V_H$ state. Therefore, $V_{ei}$ is negatively proportional to $V_{eo}$. The voltage $V_{ei}$ will also rise slowly when the negative voltage across capacitor 46 discharges through resistors 48 and 50 between times $t_1$ and $t_4$.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A bi-directional, magnetic, electrical isolator for use in a feedback control circuit for an electrical power supply;
   a first transformer having a primary winding and a secondary winding, said secondary winding being connected to a rectifier and capacitor circuit for developing a DC voltage on the capacitor, said primary winding being coupled via a controllable switching means to a DC voltage source whereby voltage can be developed on the capacitor by periodically gating the switching means into conduction;
   a second transformer having a primary winding and a secondary winding, said primary winding of said second transformer having one terminal coupled to receive a feedback signal referenced to a circuit ground plane for transfer to said secondary winding of said second transformer and having a second terminal coupled through a second controllable electronic switching means to said circuit ground plane whereby said feedback signal is transferred to said secondary winding of said second transformer upon energization of said second controllable switching means; and
   means coupling voltage on said secondary winding of said first transformer to said second controllable switching means for effecting conduction of said second switching means generally concurrently with conduction of said first switching means.

2. The electrical isolator of claim 1 and including a rectifier and capacitor signal storage circuit connected to said secondary winding of said second transformer for developing a signal on the capacitor representative of the magnitude of the feedback signal.

3. The electrical isolator of claim 2 and including reset means connected in circuit with each primary winding of each of the first and second transformers for resetting the magnetic flux of the transformers to zero between each occurrence of gating of the first controllable switching means into conduction.

4. The electrical isolator of claim 3 wherein the reset means comprises a zener diode connected in reverse parallel arrangement across each controllable switching means.

5. The electrical isolator of claim 4 wherein each of said controllable switching means comprises a transistor.

6. The electrical isolator of claim 4 and including a resistor connected in parallel circuit with the capacitor coupled to the secondary winding of the second transformer for effecting a controlled decay of the voltage on the capacitor.

7. The electrical isolator of claim 6 wherein said coupling means between said secondary winding of said first transformer and said second controllable switching means comprises a resistor connected in series circuit between a gate of the second controllable switching means and a terminal of said secondary winding of said first transformer.

8. The electrical isolator of claim 7 wherein the breakover voltage for the zener diode coupled in circuit with the first controllable switching means is selected to be much higher than the voltage applied to the primary winding of the first transformer to assure that all the magnetizing energy is dissipated between the application of gating signals to the first controllable switching means.

9. The electrical isolator of claim 8 wherein the breakover voltage of the zener diode coupled in circuit with the second controllable switching means is selected to be much higher than the voltage feedback signal magnitude to assure that all the magnetizing energy in the second transformer is dissipated between the application of gating signals to the second controllable switching means.

10. A method for magnetically isolating an input circuit from an output circuit in a switching mode power supply, the power supply including a magnetically isolated power stage and a magnetically isolated feedback stage, an error circuit for supplying an error signal representative of a difference between an actual output of the power stage and a desired output, switch means for selectively coupling the error signal to the feedback stage and a controller responsive to the error signal for controlling operation of the power stage, the feedback stage including transformer means for coupling a voltage from the input circuit to the output circuit and for coupling the error signal from the output circuit to the input circuit, the method comprising the steps of:

applying a voltage pulse of predetermined time duration to the transformer means at the input circuit for developing a bias voltage at the output circuit; and coupling the bias voltage to the switch means for enabling transfer of the error signal through the transformer means during at least the time duration of the voltage pulse.

11. The method of claim 10 wherein the transformer means comprises a pair of transformers each having a primary winding and a secondary winding, the step of applying comprising the steps of:

applying the voltage pulse to the primary winding of one of the transformers for developing bias voltage at the secondary winding of the one of the transformers; and coupling the bias voltage from the secondary winding of the one transformer to the switch means.

12. The method of claim 11 wherein the switch means is connected in series circuit with the primary winding of another of the pair of transformers and the error signal is transferred through the transformer means by the step of magnetic flux coupling between the primary winding and the secondary winding of the another of the transformers during the time duration of the voltage pulse.

13. The method of claim 12 and including the steps of:

rectifying the error signal appearing at the secondary winding of the another of the pair of transformers; and capacitively storing the rectified error signal to provide an approximated continuous value signal.

14. The method of claim 13 and including resistance means for implementing the step of controlled decay of the stored error signal.

15. The method of claim 14 and including the step of dissipating the magnetic flux in at least the another of the transformers during a time interval between each voltage pulse.

* * * * *